United States Patent [19]

Schirmer et al.

[11] 4,382,513
[45] May 10, 1983

[54] PACKAGES HAVING READILY PEELABLE SEALS

[75] Inventors: Henry G. Schirmer, Spartanburg, S.C.; Mario Gillio-Tos, Milan, Italy

[73] Assignee: W. R. Grace & Co., Cryovac Div., New York, N.Y.

[21] Appl. No.: 232,078

[22] Filed: Feb. 6, 1981

[51] Int. Cl.³ .................. B65D 65/26; B65B 25/06
[52] U.S. Cl. .................. 206/484; 426/113; 426/127; 53/443; 206/621; 206/631; 229/43; 229/3.5 R
[58] Field of Search ............... 206/621, 633, 497, 631, 206/484; 229/43, DIG. 12; 53/443; 426/127, 113

[56] References Cited

U.S. PATENT DOCUMENTS

| | | |
|---|---|---|
| 2,855,517 | 10/1958 | Rainer . |
| 3,022,543 | 2/1962 | Baird . |
| 3,083,106 | 3/1963 | Sloan . |
| 3,131,069 | 4/1964 | Goller . |
| 3,188,265 | 6/1965 | Charbonne . |
| 3,294,621 | 12/1966 | Baird, Jr. et al. .......... 229/DIG. 12 |
| 3,491,935 | 1/1970 | Trotter, Jr. et al. ............ 206/633 |
| 3,616,898 | 11/1971 | Massie . |
| 3,647,485 | 3/1972 | Seiferth et al. .................. 206/443 |
| 3,655,503 | 4/1972 | Stanley . |
| 3,663,240 | 5/1972 | Seiferth . |
| 3,663,662 | 5/1972 | Golike . |
| 3,821,182 | 6/1974 | Baird . |

FOREIGN PATENT DOCUMENTS

| | | |
|---|---|---|
| 922472 | 3/1970 | Canada . |
| 12026 | 11/1980 | European Pat. Off. . |
| 852954 | 11/1960 | United Kingdom . |
| 866819 | 5/1961 | United Kingdom . |
| 1326859 | 8/1973 | United Kingdom . |
| 1395257 | 5/1975 | United Kingdom . |
| 2003449 | 3/1979 | United Kingdom . |

*Primary Examiner*—William T. Dixson, Jr.
*Attorney, Agent, or Firm*—John J. Toney; William D. Lee, Jr.; Joseph P. Harps

[57] ABSTRACT

An easily peelable heat seal between two sheets of cross-linkable polyolefin packaging materials is achieved by cross-linking the polyolefin material in each sheet by irradiating the sheets to a dosage level of at least 3 MR prior to heat sealing the sheets together. The easily peelable seal is especially useful where film surfaces in large flange areas are sealed together.

8 Claims, 3 Drawing Figures

PACKAGES HAVING READILY PEELABLE SEALS

FIELD OF THE INVENTION

This invention relates specifically to sealing compatible polyolefin sheet materials together to form packages, particularly packages wherein large surface areas are sealed together to form the package. Generally, this invention relates to controlling peelability of both compatible and incompatible thermoplastic sheet materials by cross-linking with ionizing radiation.

BACKGROUND

It has been found desirable to package food and other products which require hermetic seals in peelable seal packages which essentially comprise a pair of superimposed sheets with the product therebetween, said sheets being sealed together to provide a seal strong enough to withstand abuse and resist separation and leakage. At the same time, it is desirable to provide for peeling the sheets apart to make the article within the package readily accessible with a minimum of effort and without the necessity of cutting or tearing the package. In one such package, a pocket or cavity is formed in one of the sheets by drawing the sheet into a mold for the retention of the product and the other sheet is used as a closure and is sealed peripherally around the cavity to a relatively large flange area. In another such package, the product is placed on an impervious backing member or sheet within a vacuum chamber and a formable film is molded around the product and sealed to a large area of the backing member to create a vacuum skin package. Such packages must protect the contents against the intrusion of moisture, air, and other contaminates and accordingly, must be impervious and have effective seals yet must be readily peelable without tearing or rupturing the packaging materials which may result in premature destruction of the package and inadvertent contamination of the contents. Furthermore, as a simple matter of convenience it is desirable that the package be openable by manually pulling apart the film sheets instead of relying upon a knife, scissors, or tear tab to open the package. Accordingly, it is one object of the present invention to provide a package which may be peeled open by only manual force.

In the prior art a number of package configurations and materials have been used in order to achieve a readily peelable seal. In some instances, an intermediate polymeric material is provided between the sheets to serve as an adhesive or as a sealant between the film sheets forming the package. However, each material layer which is added to the sheets comprising the package increases the package cost and difficulty of manufacturing. Accordingly, it is another object of the present invention to provide a package which does not require the addition of a peelable adhesive coating between the film sheets.

Also in the prior art, cross-linking by irradiation has been used to enhance the sealing properties of the films comprising a package. For example, in U.S. Pat. No. 3,106,441 which issued on Oct. 8, 1963 to J. W. Harrison et al irradiation of the seal area to greatly improve seal strength is taught. In another patent, U.S. Pat. No. 3,022,543 which issued to W. G. Baird et al on Feb. 27, 1962, a thin peelable cover of irradiated, biaxially oriented film is shown sealed to an unirradiated, thermoformed container of relatively thick plastic material. The Baird et al patent also discloses biaxially oriented, irradiated polyethylene film sealed to itself. In these prior art disclosures, the polyolefin material is either irradiated and biaxially oriented or is irradiated after the final sealing has taken place whereas it is another object of the present invention to provide a package which is made from unoriented, cross-linked polyolefin materials in which both films are cross-linked prior to sealing but not irradiated afterwards thereby forming a package having more easily peelable seals.

These and other objects will be readily apparent from the summary of the invention, drawings, and detailed description which follow:

SUMMARY OF THE INVENTION

In one aspect, the subject invention is an improvement in the process of sealing packages constructed from thermoplastic films wherein the seal which is formed is peelable and is a seal between the surfaces of two unoriented films whose surfaces comprise polyolefin material. The improved process comprises irradiating each polyolefin film with ionizing radiation to a minimum dosage level of about 3 to 7.5 MR to cross-link the film; heating at least a portion of one of the surfaces of the cross-linked polyolefin films; and then pressing the heated surface against the surface of the other film to bond them together. Thereafter the films can be readily peeled apart preferably, a force of no greater than 1000 gms/linear inch is required; and most preferred is that a force no greater than about 600 gms./linear inch is required.

In another aspect, the subject invention is a package having a peelable seal which comprises two unoriented, thermoplastic sheets with a product disposed therebetween, each of said sheets comprising polyolefin material which is cross-linked to the equivalent of a minimum dosage of 3 MR; a portion of the surface of each sheet being bonded to the other sheet by a continuous heat seal to enclose said product; and, said sealed together films being separable by a force no greater than 1000 gms./linear inch, preferably no more than 600 gms/linear inch.

DESCRIPTION OF THE DRAWINGS

In the drawings which are attached hereto and made a part of this disclosure.

DETAILED DESCRIPTION

Figure 1:
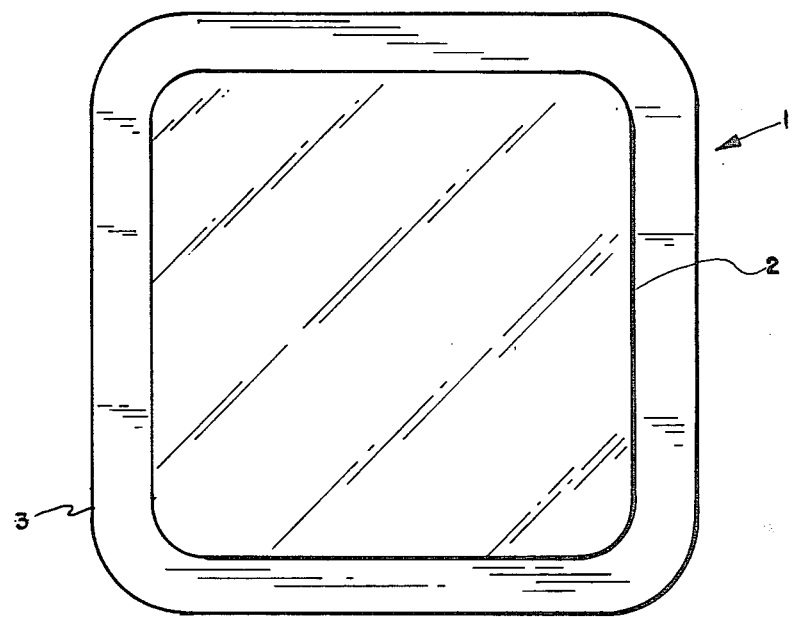
FIG. 1 is a top plan view of a package of the type which may be advantageously sealed according to the present invention.
Figure 2:
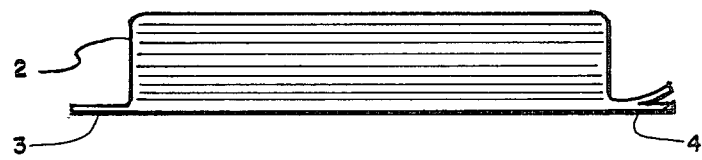
FIG. 2 is a side elevation view of the package shown in FIG. 1.

Looking at FIG. 1, a top plan view of package 1 is shown. A side elevation view of this package is shown in FIG. 2. The cavity 2 holds a product which can be a food product such as luncheon meat or cheese or it may be some other product requiring hermetic sealing such as medical or pharmaceutical supplies.

The package 1 is formed of two sheets of film with the cavity 2 being formed in one of the sheets of film which encloses substantially all of the product. The other sheet of film covers or closes the opening to the cavity 2 and the two sheets of film are sealed together in the flange area 3. A portion of the two sheets of film is not completely sealed so that a gripping tab area is available in the vicinity of seal area 4 so that both the upper and lower sheets of film may be gripped between the fingers and peeled apart to open the package.

Figure 3:
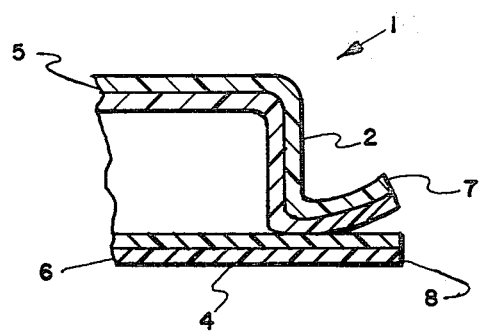
FIG. 3 is a partial section in exaggerated detail showing the surfaces sealed according to the present invention.

In FIG. 3 a partial section of package 1 is shown where the films which comprise the package are multi-layer films and the film forming the cavity 2 is multi-layer film 5. The covering or closure film 6 covers or closes the cavity 2 and encloses the product therein. Film segments 7 and 8 form the gripping tabs so that the seal in the vicinity of seal area 4 is readily separated.

In a preferred process for preparing a package according to the present invention, a sheet of unoriented, irradiated polyolefin material such as polyethylene, ethylene-vinyl acetate copolymer, or an ionomer or multi-layer films which comprise one of these materials are irradiated to cross-link the polyolefin materials within the film. A minimum dosage of about 6 to 7.5 MR is needed to make the film peelable for low density polyethylene and for films containing an ionomer polymer as the sealing layer preferred range is from about 9.0 MR to about 16.0 MR. The preferred method of irradiating the polyolefin material to achieve cross-linking is to pass the polyolefin film through the beam of a high energy electron accelerator a sufficient number of times until the desired dosage level is achieved. Cross-linking by irradiation is well known in the art.

The forming web or sheet of film having the cavity formed therein, i.e. film 5 in FIG. 3, preferably has a thickness in the range of 3 to 5 mils and the cavity is formed by any of the well known thermoforming processes such as clamping a sheet of the film over a mold cavity, heating the film to soften it so that it will be formable, drawing the film into the mold cavity or die so that conforms to the shape of the die and then releasing the molded film. Such dies will usually have a series of orifices in their bottom and side surfaces through which vacuum is drawn to suck the heated film into the die. In other processes a plug can be used to physically force the heat softened film into the die.

After the cavity is formed a product is placed in the cavity and then an unoriented, polyolefin cover sheet is placed over the cavity so that the sheet will be superposed upon the peripheral flange area of the forming web. The covering or closure film is usually applied immediately before the two webs or sheets of film— now a partially completed, unsealed package—are placed into a vacuum chamber. Once the unsealed package has been placed in a vacuum chamber and the desired level of evacuation achieved, the package is sealed under heat and pressure around the peripheral area of the forming web, i.e., in the flange area. A temperature of up to 350° F. may be used and the flange areas will usually be clamped between sealing bars which are resistance heated. A sufficient dwell time is used so that the materials forming the inner facing surfaces will form a bond. To be hermetic, the seal must be continuous in the flange area around the product, but a corner or an edge a portion of the two films may be left unsealed as shown in FIGS. 2 and 3 so that a gripping tab can be left in order to peel the films apart.

As used herein a "wide-flange" or "area" seal is one which is to be distinguished from a line or spot seal where a very high concentration of heat and pressure takes place. The "flange" or "area" seals are peripheral seals around the perimeter of the product enclosed within the package.

After the sealing is completed, the package is removed from the vacuum chamber where it is ready for commercial distribution.

Another preferred process for utilizing the present invention is the vacuum skin packaging process wherein items such as fresh red meat cuts are packaged by placing the meat product on an unoriented, cross-linked sheet of polyolefin material, within a vacuum chamber, heating a second sheet of unoriented, cross-linked polyolefin material, positioning the heated sheet above the product, evacuating the chamber, then molding the heated sheet about the product, and pressing the heated sheet against the other sheet by differential air pressure to seal the two sheets together in the continuous flange-like area around the perimeter of the product. Such a process is described in U.S. Pat. Reissue No. 30,009 which reissued on May 29, 1979 to Richard R. Perdue et al.

By irradiating films in the range of 3 to 16 MR, seals requiring forces as low as 500 gms/linear inch to separate have been achieved.

It is theorized that the cross-linking increases the viscosity of the cross-linked material so that at the seal interface the flow between the sealed together materials decreases and an adequate but not strong seal is formed. In the prior art, incompatible materials were used as the seal interface so that there would not be any true mixing of the materials and relatively low force of separation could be achieved. In the present invention, it is surprising to discover that a low seal strength can be achieved when the same materials are sealed together under heat and pressure. Even more surprising is the discovery that irradiation can control the peel strength between incompatible polyolefin materials.

EXAMPLE 1

Samples of a coextruded, multi-layer film having as one outside surface a layer of 0.8 mils thick "Surlyn" brand ionomer number 1702 (du Pont Crop., Wilmington, Del.) which layer was bonded with "Plexar" 1139 C brand ethylene-vinyl acetate copolymer adhesive (Chemplex Co., Rolling Meadows, Ill.) to a center layer of 0.3 mils hydrolyzed ethylene-vinyl acetate copolymer whose other surface layer was adherred by means of the Plexar 1138 C adhesive to 3.0 mils of Chemplex 3404 brand ethylene-vinyl acetate copolymer were irradiated by high energy electrons to dosage levels of 7.5 MR, 9.4 MR, and 11.0 MR. Each irradiated film sample plus one that was not irradiated was used as the bottom or forming web and a top web using the 9.4 MR irradiated material was used to seal to all of the bottom web materials. After the seals were made with heat and pressure a one inch strip was cut across the seal area and the ends of each strip were placed in the jaws of an Instron testing machine so that the seal was approximately at the center of the space between the gripping jaws. A strong seal which required more than 1,500 gms/inch to separate was achieved with the seal of the unirradiated forming web. A medium strength seal which required an approximately 1,000 gms/inch to separate was achieved with the 7.5 MR bottom web. An easy opening seal which required approximately 600 gms/inch to separate was achieved with the 9.4 MR bottom web and another easy open seal was achieved with the 11.0 MR bottom web which required approximately 500 gms/inch to separate. In each instance the seals "peeled" rather than ruptured, i.e., the films separated substantially in tact, which is more desirable because the package can be opened without the film breaking or tearing in the hands of the person opening the package. Based on observation, a medium strength seal would be achieved with a dosage as low as 6.0 MR which would be a seal which could be separated without rupturing the film.

One especially satisfactory seal is achieved where one surface of the interface is Surlyn 1702 (15 melt index) irradiated to 9.0 MR and the other surface is ethylene-vinyl acetate copolymer having 7% vinyl acetate (7 melt index) irradiated to 6 MR. This results in a seal having a peel strength of 600 gms/linear inch.

The foregoing test shows the effects of irradiation on the unoriented, polyolefin materials and demonstrates that with increasing dosages the peelability of the seal is enhanced. This is surprising in view of the fact that cross-linking is generally thought to strengthen polymeric materials.

In some prior art peelable seal configurations incompatible materials are used in for the seal interfaces to form seals, incompatible thermoplastic materials being those that upon melting and flowing are not soluble in the other but will form a weak bond at the interfaces of their surface where the materials have contacted each other when molten under heat and pressure. Crosslinking the materials in the interfaces can control their flow upon melting so that the bond strength and, hence, peel strength can be regulated as desired.

Having thus described our invention, we claim:

1. In the process of sealing and opening packages constructed from thermoplastic film and having large flange areas, the improvement which comprises forming a readily peelable seal between the surfaces of two unoriented films whose sealed together surfaces comprise polyolefin material, by performing the steps of:
a. irradiating each polyolefin film with ionizing radiation to a minimum dosage level of about 3 MR to cross-link same;
b. forming a package by heat sealing a portion of the surfaces of said cross-linked polyolefin films together with a product enclosed therebetween to cause said films to bond together in a hermetic seal in the flange area around the perimeter of the product; and, thereafter,
c. opening said package by peeling said films apart in the sealed area without rupturing either of the films.

2. The process of claim 1 wherein at least one of said polyolefin films is an outer layer in a multi-layer film and the package can be opened by using a force not greater than 1000 gms/linear inch.

3. The process of claim 1 wherein said polyolefin films are selected from the group consisting of ethylene-vinyl acetate copolymers, polyethylene, and isomers.

4. The process of claim 3 including prior to step (b) the steps of:
(i) thermoforming a product receiving cavity in one of said films;
(ii) filling said cavity with a product; and
(iii) covering said filled cavity with the other film.

5. A package having a peelable seal comprising:
a. two unoriented multi-layer, thermoplastic sheets with a product disposed therebetween;
b. each of said sheets comprising material which is cross-linked to the equivalent of a minimum dosage of 3 MR, the bonding surface layer of each sheet comprising polymeric material selected from the group consisting of homopolymers, copolymers, and ionomers of ethylene;
c. a portion of the surface of each sheet being bonded to the other sheet by a relatively wide, continuous, peripheral, heat seal to enclose said product; and,
d. said sealed together films being separable by a force of not more than 1000 gms./linear inch.

6. The package of claim 5 wherein at least a portion of one of said sheets conforms to the shape of said products.

7. A package having a peelable seal comprising:
a. a first thermoplastic sheet having a cavity formed therein, said sheet having a peripheral sealing surface encircling said cavity, the material forming said sealing surface comprising a material selected from the group consisting of homopolymers, copolymers, and ionomers of ethylene which have been cross-linked to the equivalent of a minimum dosage of 9.0 MR;
b. a product disposed within said cavity;
c. a second thermoplastic sheet closing the opening to said cavity and enclosing the product between said first and second sheets, said second sheet having a sealing surface, the material forming said sealing surface comprising a material selected from the group consisting of homopolymers, copolymers, and ionomers of ethylene which have been cross-linked to the equivalent of a minimum dosage of 9.0 MR;
d. a continuous heat seal between the sealing surfaces of said first and second films which hermetically seals said product between said films, said seal being separable by a force of not more than 600 gms./linear inch.

8. The package of claim 7 wherein at least one of the thermoplastic sheets is a multi-layer film.

* * * * *